United States Patent [19]

Smojver

[11] Patent Number: 5,690,900
[45] Date of Patent: Nov. 25, 1997

[54] AMMONIA OXIDATION CATALYST

[76] Inventor: Radmil Smojver, P.O. Box 750-910, Petaluma, Calif. 94975

[21] Appl. No.: 729,250

[22] Filed: Oct. 10, 1996

[51] Int. Cl.[6] .................. C01B 21/26; C01B 21/38
[52] U.S. Cl. ......................... 423/392; 423/403
[58] Field of Search .................... 423/392, 403

[56] References Cited

U.S. PATENT DOCUMENTS

| | | | |
|---|---|---|---|
| 3,947,554 | 3/1976 | Senes et al. | 423/403 |
| 3,962,138 | 6/1976 | Ray et al. | 252/462 |
| 4,714,694 | 12/1987 | Wan et al. | 502/304 |
| 4,774,069 | 9/1988 | Handley | 423/403 |
| 4,808,558 | 2/1989 | Park et al. | 501/80 |
| 4,869,891 | 9/1989 | Handley | 423/403 |
| 4,963,521 | 10/1990 | Engler et al. | 502/207 |
| 5,082,807 | 1/1992 | Gesing et al. | 501/93 |
| 5,160,722 | 11/1992 | Hochella et al. | 423/403 |
| 5,185,297 | 2/1993 | Park et al. | 501/80 |
| 5,217,939 | 6/1993 | Campbell | 502/339 |
| 5,242,882 | 9/1993 | Campbell | 502/325 |
| 5,256,387 | 10/1993 | Campbell | 423/392 |
| 5,296,416 | 3/1994 | Park et al. | 501/80 |
| 5,336,656 | 8/1994 | Campbell | 502/329 |
| 5,441,919 | 8/1995 | Park et al. | 501/80 |
| 5,456,833 | 10/1995 | Butcher et al. | 210/488 |

*Primary Examiner*—Wayne Langel
*Attorney, Agent, or Firm*—Dergosits & Noah LLP

[57] ABSTRACT

A catalyst composition for oxidation of ammonia in the production of nitric acid incorporates a porous ceramic structure which is at least partially coated, the coating including a layer containing alumina, zirconium and cerium, a layer containing cobalt, cerous zirconium and optionally manganese, and a layer containing platinum.

3 Claims, No Drawings

AMMONIA OXIDATION CATALYST

BACKGROUND OF THE INVENTION

1. Field of the Invention

The present invention relates to catalysts be used for oxidation of ammonia and production of nitric acid and, more particularly, to catalysts incorporated on ceramic structures.

2. Description of Related Art

Commercial processes for production of nitric acid frequently involve oxidation of ammonia using a catalyst made from platinum or alloys thereof at very high temperatures, e.g., 1000° C. Ammonia is made to pass over plates or woven mesh made of platinum or platinum/rhodium alloy where it oxidizes to nitric oxide (NO). The nitric oxide is converted to nitrogen oxides ($NO_2$) by combining with air and then water to produce nitric acid.

The use of precious metals in the production of nitric acid is expensive since the catalyst metal is ultimately lost. Consequently, efforts have been made to reduce costs by reducing the amount of precious metal used or by providing alternative catalysts. For example, cobalt oxide based catalytic substances for oxidation of ammonia are described in U.S. Pat. No. 3,962,138. The catalyst therein contains 60–95% by weight cobalt oxide, 5–15% by weight aluminum oxide and from 0–25% by weight of certain enumerated oxides including thorium, cerium, zinc, cadmium and zirconium which are stated as not substantially improving the essential qualities of the catalyst. However, cobalt oxide based catalysts have met with limited success.

Ceramic materials have been used as supports or scaffolds for catalytic substances. For example, U.S. Pat. No. 4,963,521 is directed to an exhaust-gas catalyst said to have reduced tendency to store sulfur oxides which, in one embodiment, incorporates a ceramic honeycombed body of cordierite. As described therein, $\gamma$-$Al_2O_3$ in powder form is charged with $ZrO_2$ and cerium dioxide. The $Al_2O_3$ doped in this manner is then made into an aqueous dispersion and coated onto the honeycomb which is then impregnated with salt solutions of platinum (platinum nitrate), rhodium (rhodium chloride) and palladium. The '521 patent contains no indication that such a catalyst could be useful for oxidizing ammonia. U.S. Pat. No. 5,217,939 describes a catalyst for the production of nitric acid by oxidation of ammonia involving reticulated ceramic or metal substrate coated with cobalt compounds or a noble metal. According to the description, a foamed ceramic structure is immersed in a solution of an organic solvent and from about 1–30 wt. % of a carboxylate salt of cobalt, noble metal or mixture thereof, followed by firing at 260° to 800° C. As the examples show, most of the ammonia conversion product is nitric oxide (i.e., 93–95 mole %). Similarly, the primary product of standard nitric acid plant facilities is typically nitric oxide. Thus, further processing is necessary to convert nitric oxide (NO) to $NO_2$ and then to nitric acid.

There is a continuing need for more efficient and economical catalysts in the production of nitric acid.

SUMMARY OF THE INVENTION

In one aspect, the present invention provides a catalyst composition including at least two structural layers, at least one structural layer of a porous ceramic having a coating, the coating including at least one washcoat layer which includes aluminum, zirconium and cerium, and at least one base metal layer which includes cobalt, cerium and zirconium, and at least one layer which includes platinum. The catalyst composition also includes at least one structural layer of zirconium toughened alumina foam or cordierite.

A method of making a catalyst composition is also provided which includes providing a porous ceramic structure, contacting and at least partially coating the porous ceramic structure with an acidic aqueous washcoat solution which includes alumina, a zirconium salt and a cerium salt and calcining the resulting washcoated structure. The calcined washcoated structure is contacted and at least partially coated with a base metal solution which includes a cobalt salt, a cerous salt and a zirconium salt and calcined. The resulting structure is contacted and at least partially coated with a solution containing a platinum salt and a dispersing agent, and calcined.

In yet another aspect, a method of making nitric acid is provided which includes providing a catalyst composition which includes a porous ceramic structure having at least a partial coating, the coating including at least one washcoat layer which includes alumina, zirconium and cerium, and at least one layer which includes cobalt, cerium and zirconium, and at least one layer which includes platinum. The catalyst composition is contacted with ammonia and heated, thus forming $NO/NO_2$. The $NO/NO_2$ is then converted into nitric acid.

In still yet another aspect, a catalyst composition is provided which includes at least one structural layer of porous ceramic which is at least partially coated, the coating including at least one washcoat layer which includes alumina, zirconium and cerium, at least one layer which includes cobalt, cerium and zirconium, and at least one layer which includes platinum.

DETAILED DESCRIPTION

The present invention provides a relatively economical and efficient catalyst composition useful for the production of commercial quantities of nitric acid. As was mentioned above, a typical commercial process yields nitric oxide (NO) as a primary product which must be oxidized to yield nitrogen oxides ($NO_2$) prior to formation of nitric acid ($HNO_3$). A catalyst according to the present invention surprisingly and unexpectedly provides a primary product having a relatively high yield of $NO_2$, e.g., from about 75/25 to about 60/40 $NO/NO_2$ under atmospheric pressure and at temperatures consistent with typical plant operating temperatures.

A catalyst composition according to the present invention incorporates at least one layer of a porous ceramic structure which acts as a scaffold or support for various catalytic elements. Such a ceramic structure may take the form of a reticulated body of open cells interconnected randomly in three dimensions. Cell density can be varied and is preferably from about 200 to about 600 cells per square inch and most preferably about 300 to about 400 cells per square inch. Suitable ceramic structures are commercially available, for example, from Selee Corporation of North Carolina. Cordierite may also be used, and in some circumstances is the preferred embodiment.

An aqueous washcoat solution is contacted with a porous ceramic structure to create a layer of constituents of the solution which preferably impregnate and are distributed across the structure. The washcoat solution includes alumina which is milled to a small particle size. Also included is zirconium salt which is preferably zirconium oxide and cerium salt which is preferably cerium nitrate. The washcoat solution is further composed of water which is preferably deionized and made acidic (pH ranging from about 3 to about 6.5) with an acid, with nitric acid being preferred.

The ceramic structure is immersed in washcoat solution. After removing the washcoat impregnated ceramic structure from the washcoat solution, the structure is calcined at from about 1100° F. to about 2000° F., but preferably from about 1400° F. to about 1800° F. to remove volatile elements. After calcining, the washcoat has been deposited on the ceramic structure with a density which may range from about 0.5 to about 2.0 grams per cubic inch, but preferably ranges from about 1.0 to about 1.2 grams per cubic inch. The resulting surface area may range from about 50 to about 150 square meters per gram and more preferably about 80 to about 120 square meters per gram.

The washcoated ceramic structure is then coated with at least two layers of metalcoat. The first layer is deposited from a base metal solution including a cobalt salt such as cobalt acetate, a cerium salt such as cerium nitrate and a zirconium salt such as zirconium acetate. Manganese salts such as manganese chloride and manganese sulfate may be included in the base metal solution. The solution is further composed of water which is preferably deionized and has a pH ranging from about 3 to about 6.5 which may be adjusted with an acid. The washcoated ceramic structure is immersed in the base metal solution. After removing the ceramic structure from the base metal solution, the structure is calcined at from about 1100° F. to about 2000° F., but preferably from about 1400° F. to about 1800° F. to remove volatile elements. After calcining, the structure has been coated in concentrations which may range from about 100 to about 700 grams per cubic foot, but preferably ranges from about 150 to about 600 grams per cubic foot.

The second metal coat layer is deposited from a solution including a platinum salt such as platinum oxalate in water which is preferably deionized and has a pH ranging from about 3.5 to about 6. The pH may be adjusted with an acid. A dispersing agent, triethanolamine being preferred, is added to the platinum solution. It is preferred that substantially equal amounts of platinum and dispersing agent be incorporated into the platinum solution. The base metal coated ceramic structure is immersed in the platinum solution. After removing the ceramic structure from the platinum solution, the structure is calcined at from about 1100° F. to about 2000° F., but preferably from about 1400° F. to about 1800° F. to remove volatile elements. After calcining, the structure has been coated in concentrations preferably ranging from about 15 to about 150 grams per cubic foot.

It is contemplated that a catalyst composition according to the present invention can incorporate one or more layers of the above-described coated ceramic structure. Layers may be constructed by simply placing coated ceramic structures in adjacent relation to one another (vertically or horizontally) or, alternatively, by securing them together mechanically by well-known mechanisms such as screws, bolts, clamps and the like. The coated ceramic structures may also be chemically secured to one another by using adhesives or other bonding agents known in the art. The characteristics of each layer can be varied in relation to the other layers. For example, a first layer may contain different amounts of washcoat/base metal coat/platinum ratios as compared to another layer or the ceramic structure layers may incorporate differing amounts of cells per square inch.

A catalyst composition made in accordance with the present invention may optionally include one or more layers of zirconia toughened alumina foam. Such foam may contain from about 5 to about 100 pores per linear inch, and preferably contains from about 10 to about 30 pores per linear inch. Cordierite may be used as a layer. As above, the layer(s) of alumina foam may simply be placed in adjacent relation or secured mechanically or chemically as described in connection with ceramic structures above.

The following examples are provided for purposes of illustration and should not be construed as limiting the scope of the present invention.

EXAMPLE 1

Ceramic blocks (Selee Corporation) having between ~300–400 cells per square inch were immersed in washcoat solution containing 31.68 weight percent alumina (milled to ~350 mesh), 1.74 weight percent zirconium oxide and 1.58 weight percent cerium nitrate in deionized water having nitric acid added to adjust the pH to 3.5. The washcoated ceramic blocks were removed from the washcoat solution and calcined, leaving a coating of 1.0 to 1.2 grams per cubic inch. The surface area of the blocks was measured to be between 80 and 120 meters per gram.

EXAMPLE 2

A ceramic core 0.94 inches in diameter and 1 inch long was taken from a washcoated ceramic block having a cell density of ~300 cells per square inch as described in Example 1. The washcoated ceramic core was immersed in a base metal solution containing cobalt acetate, cerium nitrate and zirconium acetate in deionized water. The base metal coated ceramic core was removed from the base metal solution and calcined to achieve a post-fired loading of 215 grams cobalt per cubic foot, 209 grams cerium per cubic foot and 322 grams zirconium per cubic foot.

EXAMPLE 3

The coated ceramic core from Example 2 was immersed in a platinum solution containing platinum oxalate and triethanolamine in deionized water. The platinum coated ceramic core was removed from the platinum solution and calcined to achieve a post-fired loading of 100 grams platinum per cubic foot.

EXAMPLE 4

The catalyst composition product core of Example 3 was loaded into a reaction chamber. Preheated air was mixed with 10 volume percent ammonia and passed over the core with a lightoff temperature of 370° F. The outlet gas stream was measured for $NO/NO_2$ by a chemiluminescent analyzer. Ammonia conversion to $NO/NO_2$ was between 95–100% with a $NO/NO_2$ ratio of 60/40. The system was run continuously for 20 days (with the exception of brief shutdown to change ammonia tanks) with no change in conversion.

EXAMPLE 5

A pilot test site was established where platinum gauze was replaced with a catalyst composition as described below. The catalyst composition was composed of three layers of coated ceramic and one layer of zirconia toughened alumina foam. The top layer measured 6 inches by 6 inches by 5 inches and contained ~400 cells per square inch. The next layer measured 6 inches by 6 inches by 2 inches and contained ~300 cells per square inch. The next layer measured 6 inches by 6 inches by 5 inches and contained ~300 cells per square inch. The bottom layer was composed of a 1 inch thick zirconia toughened alumina foam having a diameter of 30 inches. Each ceramic layer was treated with washcoat solution in a manner similar to that described in Example 1. Each layer was immersed in a base metal solution containing cobalt acetate, cerium nitrate and zirconium acetate in deionized water. The base metal coated layers were removed from the base metal solution and calcined to achieve a post-fired loading of 215 grams cobalt per cubic foot as cobalt acetate, 209 grams cerium per cubic foot as cerium nitrate and 322 grams zirconium per cubic foot as zirconium acetate. The coated layers were then immersed in a platinum solution containing platinum oxalate and triethanolamine in deionized water. The platinum coated layers were removed from the platinum solution and calcined to achieve a post fired loading of 100 grams platinum per cubic foot as platinum oxalate.

The layers were assembled. The assembled catalyst composition was placed in a basket ordinarily used to secure platinum gauze and inserted into a reactor. The reactor was operated at flows ranging from about 28,000 scfm to about 38,400 scfm and approximately 97 psig. Ammonia feed ranged from 9.04 to 9.70 volume percent in air. The inlet flow temperature was set at 470° F. and the outlet flow temperature ranged from about 1600° F. to about 1670° F. depending on ammonia concentration. Catalyst performance was measured by analyzing the outlet gas stream for NO by chemiluminescence which showed an ammonia to NO conversion rate of between about 60 to about 80 percent. Gas samples were also titrated for nitric acid and ammonia with an ammonia to acid conversion averaging 65%. The reactor containing the catalyst composition was run for about 24 hours with no changes in performance. The catalyst composition was removed from the reactor and analyzed. No loss of platinum, cobalt, cerium or zirconium was detected.

The embodiments and examples described above should not be considered as limiting the invention. Those with skill in the art can envision numerous modifications which are intended to be within the scope of the following claims.

What is claimed is:

1. A method of manufacturing nitric acid comprising:

providing a catalyst composition which includes a porous ceramic structure having a coating, the coating including at least one washcoat layer which includes alumina, zirconium and cerium, at least one layer which includes cobalt, cerium, zirconium and optionally manganese, and at least one layer which includes platinum;

contacting the catalyst composition with ammonia and oxygen and heating so as to form;

$NO/NO_2$; and converting the $NO/NO_2$ into nitric acid.

2. A method according to claim 1 wherein the yield of $NO/NO_2$ ranges from about 75/25 to about 60/40.

3. A method according to claim 1 wherein the washcoat layer is present in an amount ranging from about 0.5 to about 2 grams per cubic inch, the cobalt containing layer is present in an amount ranging from about 100 to about 700 grams per cubic foot, and platinum is present in an amount ranging from about 15 to 150 grams per cubic foot.

* * * * *